G. WINDSCHILD.
WATER FILTER.
APPLICATION FILED OCT. 15, 1908.

932,219.

Patented Aug. 24, 1909.
2 SHEETS—SHEET 1.

Witnesses:
Flora Greenwald.
Jacob L. Dimond.

Inventor:
Gustav Windschild,
by L. K. Bohn,
Attorney.

G. WINDSCHILD.
WATER FILTER.
APPLICATION FILED OCT. 15, 1908.

932,219.

Patented Aug. 24, 1909.
3 SHEETS—SHEET 2.

Witnesses:
Flora Grunwald.
Jacob L. Diamond.

Inventor:
Gustav Windschild,
by L. H. Böhm,
Attorney.

G. WINDSCHILD.
WATER FILTER.
APPLICATION FILED OCT. 15, 1908.
939,219.
Patented Aug. 24, 1909.
3 SHEETS—SHEET 3.
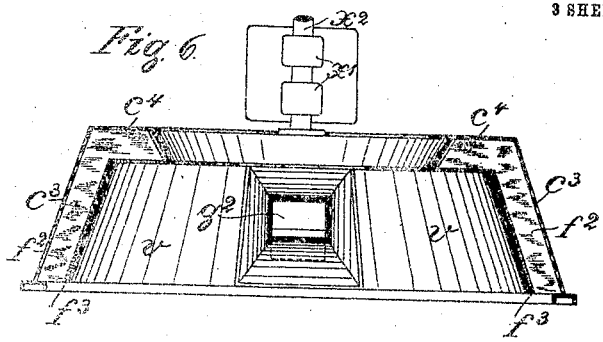
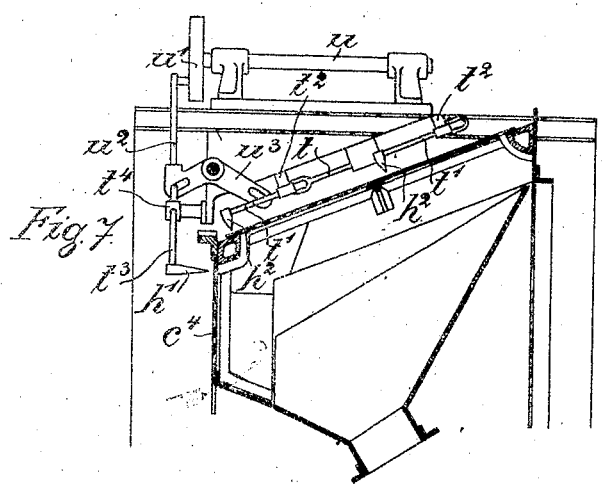
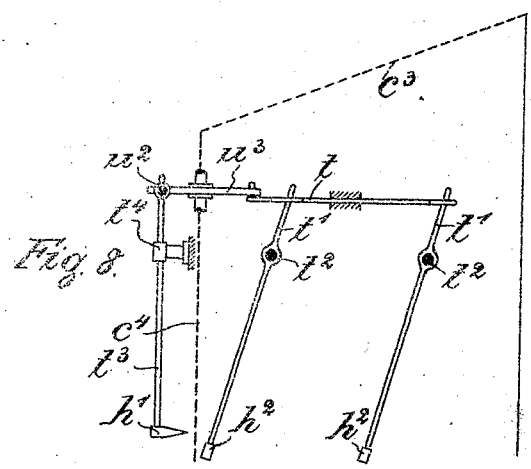
Witnesses:
Flora Greenwald
Jacob L. Diamond
Inventor:
Gustav Windschild.
by L. C. Böhm,
Attorney.

UNITED STATES PATENT OFFICE.

GUSTAV WINDSCHILD, OF COSSEBAUDE, GERMANY.

WATER-FILTER.

932,219.

Specification of Letters Patent.    Patented Aug. 24, 1909.

Application filed October 15, 1908. Serial No. 457,817.

*To all whom it may concern:*

Be it known that I, GUSTAV WINDSCHILD, a subject of the King of Saxony, and resident of Cossebaude, in the Kingdom of Saxony, German Empire, have invented certain new and useful Improvements Relating to Water-Filters, of which the following is a specification.

This invention relates to water filters in which a movable sieve is employed.

The invention is specially applicable to the filters used for filtering the refuse water from towns and other refuse water in which solid particles are carried in suspension. In such sieves several methods have already been proposed for cleaning the surface of the sieve from solid particles so as to prevent blocking up of the openings in the sieve. Thus it has already been proposed to employ air streams directed from a perforated pipe onto the surface of the sieve. The action of such an arrangement however is not satisfactory, as threads, hairs and the like are not effectively removed.

According to the present invention in the first place complete removal of all particles settling on the sieve is obtained by arranging one or several nozzles so that they may be reciprocated rapidly in a direction at right angles to the direction of motion of the sieve. In this way a cutting action is obtained by means of the air streaming from the nozzles.

Another important object of the present invention is to provide a construction of sieve which will be applicable to those means which have only a small head.

Figure 1:
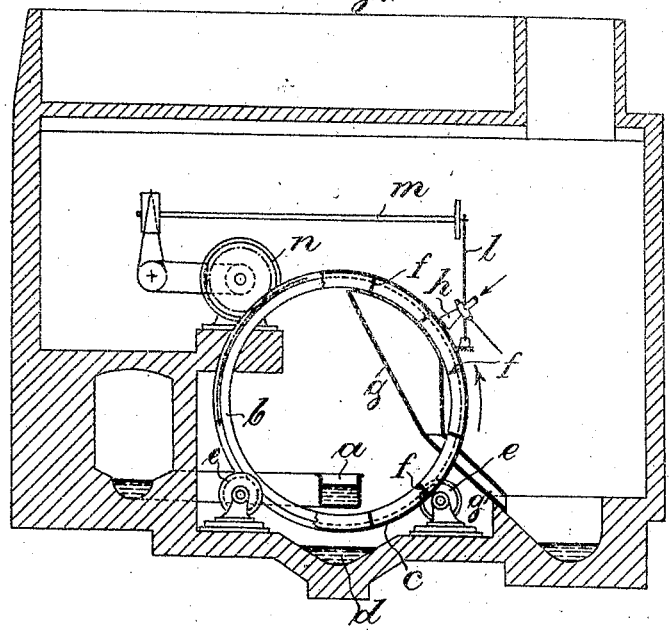
Figure 2:
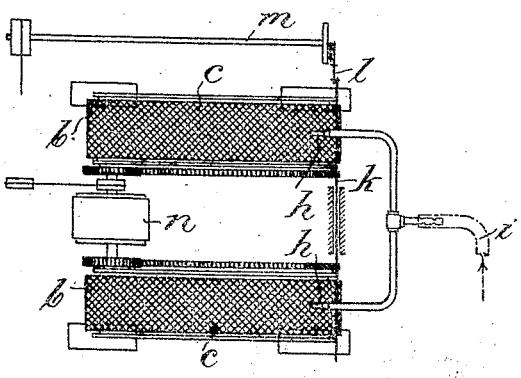
Figure 3:
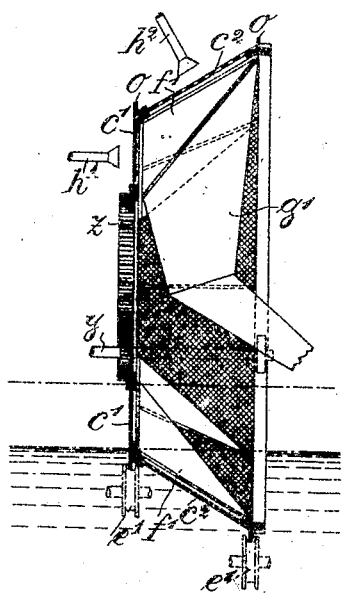
Figure 4:
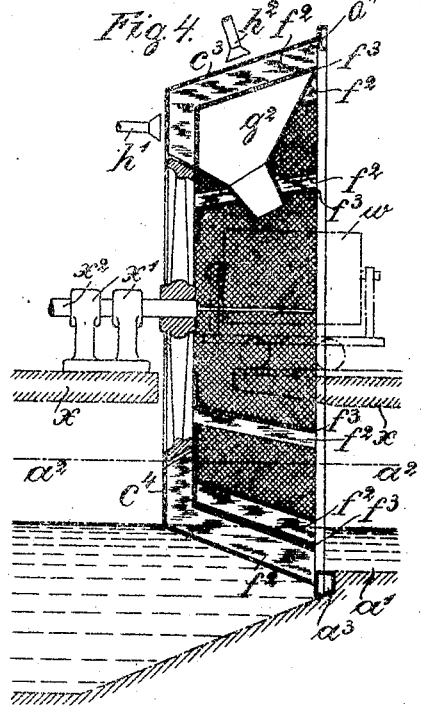
Figure 5:
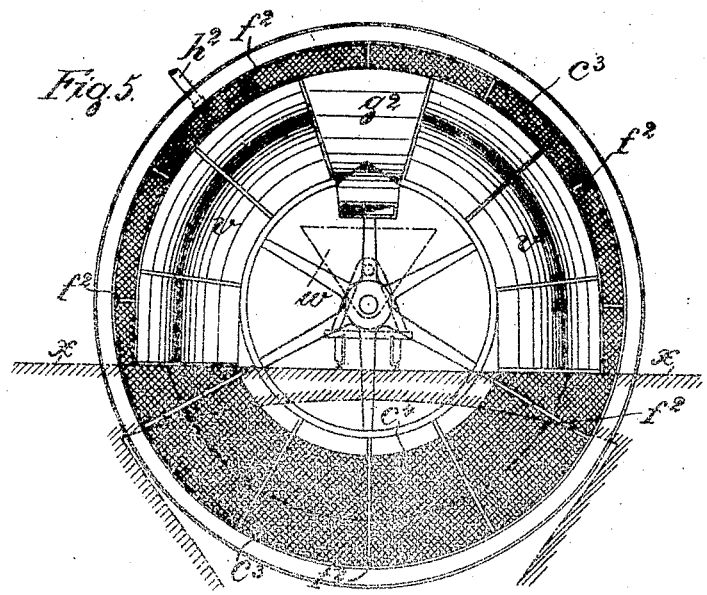

The nature of the invention and the method in which it may be carried into practical effect will be more readily understood from the accompanying drawings in which:

Figure 1 shows a refuse water filter in which the movable sieves are of cylindrical form, Fig. 2 is a plan view of the device shown in Fig. 1; Figs. 1 and 2 are only diagrammatic. Fig. 3 is a sectional side view of a form of conical sieve, Fig. 4 shows a slightly modified form of sieve, Fig. 5 is a front view of the sieve shown in Fig. 4. Fig. 6 is a horizontal cross section of the sieve shown in Fig. 4. Figs. 7 and 8 are elevation and plan respectively of the gear by which the nozzles are moved.

In carrying the invention into effect according to the form shown in Fig. 1 the refuse water flows through a trough $a$ to the cylindrical sieve $c$ which runs on rollers $e$. The filtered water passes away by the trough $d$. The muddy refuse left on the sieve is removed by means of the vanes or plates $f$ and carried to the upper part of the drum where it is discharged into a hopper $g$. For the purpose of cleaning the sieve there is arranged above each drum a nozzle $h$ which is fed with high pressure air through a flexible pipe $i$. The nozzles $h$ are provided with slit-like openings which lie at right angles to the axis of the drum. As can be seen in Fig. 2 the nozzles $h$ are joined by means of a rod $k$ which is reciprocated quickly by means of a crank and connecting rod $l$ driven by a shaft $m$. The shaft $m$ may conveniently be driven from the motor $n$ which also drives the sieve $c$. It will be seen that with this method of working the nozzles $h$ there is secured a knife-like or cutting action owing to the stream of air moving crosswise to the direction of motion of the sieve.

In Fig. 3 there is illustrated a form of the invention which is applicable in those cases in which a very small head is available for the refuse water.

In Fig. 1 it will be seen that the drop of the water is from the trough $a$ to the trough $d$, but in Fig. 3 the construction is such that the water level is substantially the same above and below the sieve. The sieve is, as can be seen, in the form of a truncated cone $c^2$ which is provided with a front flat part $c'$. This sieve is supported on rollers $e'$; it is further driven by means of a toothed wheel $z$ fastened to the plate $c'$ and gearing with a driving shaft $y$. Carried by the rotating sieve $c'$ there are blades $f'$ which discharge into the hopper $g'$.

In Fig. 3 the nozzles $h'$ and $h^2$ are only diagrammatically indicated. The method in which these nozzles are moved is hereinafter described with reference to Figs. 7 and 8.

According to the form of the invention shown in Figs. 4 to 6 the sieve is also in the form of a truncated cone part $c^3$ and a flat ring part $c^4$. These parts are carried by a shaft $x^2$ supported in bearings $x'$ which rest on the flooring $x$; this flooring is arranged over the duct $a'$ through which the water to be filtered passes. The dotted line $a^2$ represents the highest point to which the water is likely to rise in the duct $a$ and it will be seen that the front perforated plate or sieve $c^4$ extends up to this line. The rim $a^4$ of the sieve $c^3$ rests against a face plate $a^3$ on the duct $a'$. As in the prior forms described plates $f^2$ are provided on the sieve which act simultaneously as blades to carry off the mud or the like filtered from the water and as strengthening ribs. The blades $f^2$ are provided at their ends with rubber bands $f^3$ which are adapted to bear against the outside of a fixed housing $v$. The housing $v$ is not shown in Fig. 4 but from Fig. 5 it will be seen that this housing is continued around the sieve from the floor level. It may however, if desired, be continued for a greater distance. At the upper part of the housing $v$ conveniently the highest point, a hopper $g^2$ is arranged to receive the mud and the like discharged from the blades $f$ and conduct the same to a wagon $w$ which is conveniently run on rails extending inside the sieve as shown.

The movable nozzles $h'$ and $h^2$ are preferably arranged as shown opposite the hopper $g^2$. The method in which the necessary motion is transmitted to the nozzles $h'$ and $h^2$ is illustrated in Figs. 7 and 8. A rotating shaft $u$ is provided with a crank $u'$ which connects through a rod $u^2$ to an oscillating lever $u^3$. The lever $u^3$ is pivoted at its center and is provided with two slots in which there engage the ends of rods $t$ and $t^3$. The rod $t$ is also provided with slots in which there engage the ends of rods $t'$ pivoted at $t^2$. The rods $t'$ carry at their opposite extremities the nozzles $h^2$ shown as two in number which are adapted to move over the conical part $c^3$ of the sieve. The extremity of the rod $t^3$ which is pivoted at $t^4$ is adapted to carry the nozzle $h'$ which is arranged to move over the flat front plate $c^4$.
The nozzle which I prefer to employ is preferably of the shape seen in side view in Fig. 1, see $h$, and in plan in Fig. 2. In this form of nozzle the air passes out in a thin broad stream which has, what might be called, a cutting action on the material within the meshes of the filter. As can be seen from Figs. 1 and 2 the nozzles $h$ are held in a position with the broad direction of the stream at right angles to the axis of rotation of the sieve. This arrangement is, I find, the one best calculated to produce successful results.

I claim:—

1. In a water filter, in combination with a movable sieve, means for cleaning said sieve comprising, an air discharging nozzle and means for reciprocating said nozzle quickly in a direction at right angles to the direction of motion of the sieve.

2. In a water filter in combination with a rotatable sieve, means for cleaning said sieve comprising, an air discharging nozzle clear of said sieve, and means for reciprocating said nozzle over the exterior of said sieve in an axial direction.

3. In a water filter in combination with a movable sieve, means for cleaning said sieve comprising, an air discharging nozzle having a flat formed opening therein and means for rapidly reciprocating said nozzle in a direction at right angles to the direction of motion of the sieve.

4. In combination a duct for impure water, a face plate on the end of said duct, a conical filter rotatable opposite the end of said duct and dipping into the same to close off said end and a rim on said conical filter bearing on the face plate at the end of the duct for the purpose described.

5. In a water filter, in combination a conical sieve, means for rotating said sieve, blades on said sieve for transporting solid material, a hopper to which said solid material is discharged and means for cleaning said sieve, comprising air discharging nozzles and means for reciprocating said nozzles quickly over the surface of the sieve in a direction at right angles to the motion thereof.

6. In a water filter in combination a sieve in the form of a truncated cone, a flat ring sieve part on the narrow end of said conical sieve part and means for rotating said sieve parts, substantially as described.

7. In a water filter in combination, a sieve in the form of a truncated cone, a flat ring sieve part on the narrow end of said conical sieve part, blades carried by said sieve parts, means for rotating said sieve parts, and a fixed housing within said sieve and over which said blades move.

8. In a water filter in combination, a sieve in the form of a truncated cone, a flat ring sieve part on the narrow end of said conical sieve part, blades carried by said sieve parts, means for rotating said sieve parts, a fixed housing within said sieve and over which said blades move, and a hopper on said housing at its upper end.

9. In a water filter in combination, a sieve in the form of a truncated cone, a flat ring sieve part on the narrowed end of said conical sieve part, blades carried by said sieve parts, means for rotating said sieve parts, a fixed housing within said sieve and over which said blades move, a hopper on said housing at its upper end, and means for cleaning said sieve comprising air discharging nozzles adapted to move over the exterior surface of said sieves in a direction at right angles to the motion of said sieves.

10. In combination with a movable conical sieve, having a truncated conical part and a flat ring part on the narrow end of said conical part, means for cleaning said sieve comprising air discharging nozzles arranged to move over the conical part of said sieve and similar nozzles adapted to move over the flat part of said sieve and common driving means for said nozzles.

In witness whereof I have hereunto set my hand in the presence of two witnesses.

GUSTAV WINDSCHILD.

Witnesses:
PAUL ARRAS,
CLÁRE SIMON.